United States Patent [19]

Fuller

[11] Patent Number: 4,485,611

[45] Date of Patent: Dec. 4, 1984

[54] ADJUSTABLE AUTOMATIC TRAY LOADING AND INDEXING MECHANISM

[75] Inventor: Robert D. Fuller, Minneapolis, Minn.

[73] Assignee: Slide Shooters, Inc., Minneapolis, Minn.

[21] Appl. No.: 293,954

[22] Filed: Aug. 18, 1981

[51] Int. Cl.³ .............................................. G03B 23/02
[52] U.S. Cl. ......................................... 53/501; 53/77; 353/112
[58] Field of Search ................. 53/246, 266, 501, 534, 53/253, 77; 353/111, 107, 112, 117

[56] References Cited

U.S. PATENT DOCUMENTS

| | | | |
|---|---|---|---|
| 1,141,456 | 6/1915 | Frederiksen | 353/107 |
| 1,146,323 | 7/1915 | Gay et al. | 353/107 |
| 1,327,898 | 1/1920 | Barr | 353/107 |
| 1,446,999 | 2/1923 | Whitehead | 353/107 |
| 1,504,657 | 8/1924 | Trueblood | 353/107 |
| 1,656,389 | 1/1928 | Nothstine | 353/107 |
| 1,695,029 | 12/1928 | Ryder | 353/107 |
| 2,250,297 | 7/1941 | Ditty et al. | 353/107 |
| 2,523,517 | 9/1950 | Potter | 53/501 |
| 3,270,448 | 9/1966 | Holzer | 353/107 |
| 3,339,455 | 9/1967 | Karpe et al. | 353/107 |
| 3,644,031 | 2/1972 | Bennett | 353/103 |
| 3,781,103 | 12/1973 | DiPietro | 353/117 |
| 3,953,119 | 4/1976 | Erchoff | 353/117 |
| 4,024,966 | 5/1977 | Schenck | 353/112 |
| 4,354,745 | 10/1982 | Armstrong | 353/112 |

*Primary Examiner*—Nicholas P. Godici
*Assistant Examiner*—Kurt Rowan
*Attorney, Agent, or Firm*—Dorsey & Whitney

[57] ABSTRACT

A loading and indexing mechanism for loading articles into successive compartments in a circular tray is shown. It is particularly adapted for use with slide transparencies and their circular trays. The mechanism uses a pawl and gear arrangement to catch and hold successive compartments of a tray in registration with the insertion station. Cams are used to cause turning of the axle on which the tray is mounted and engagement and disengagement of the pawl and gear in coordination with each insertion operation.

13 Claims, 13 Drawing Figures

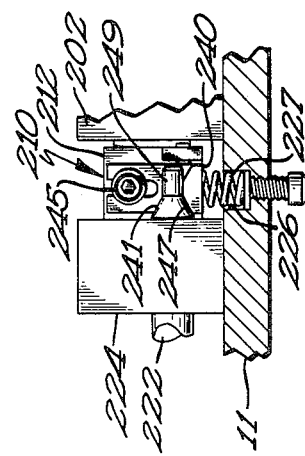
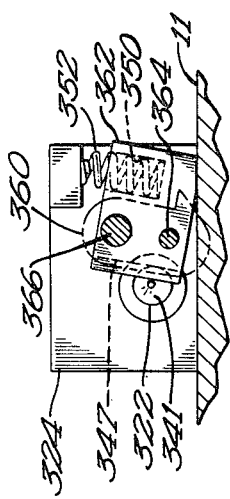
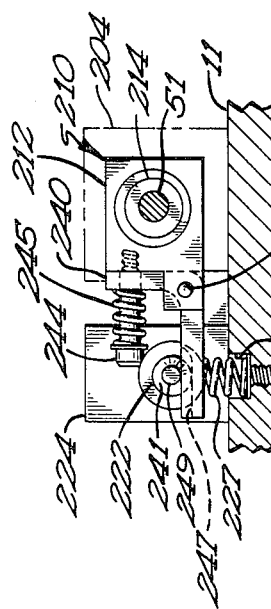
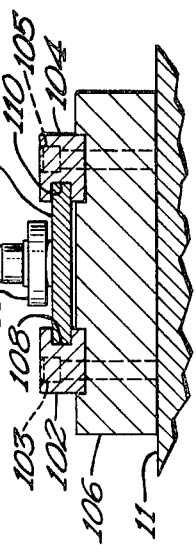
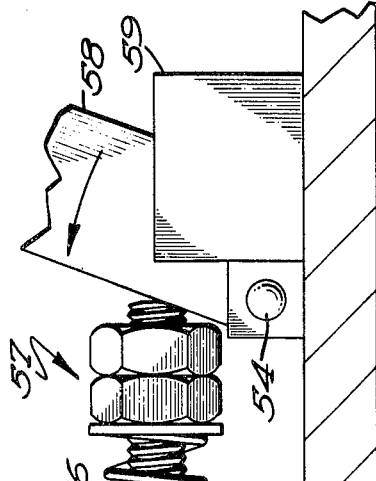
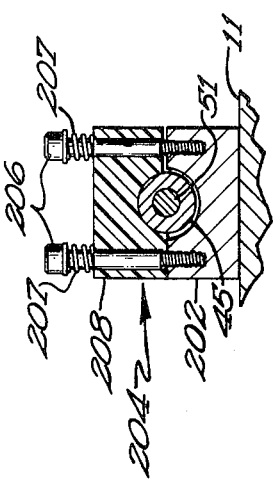
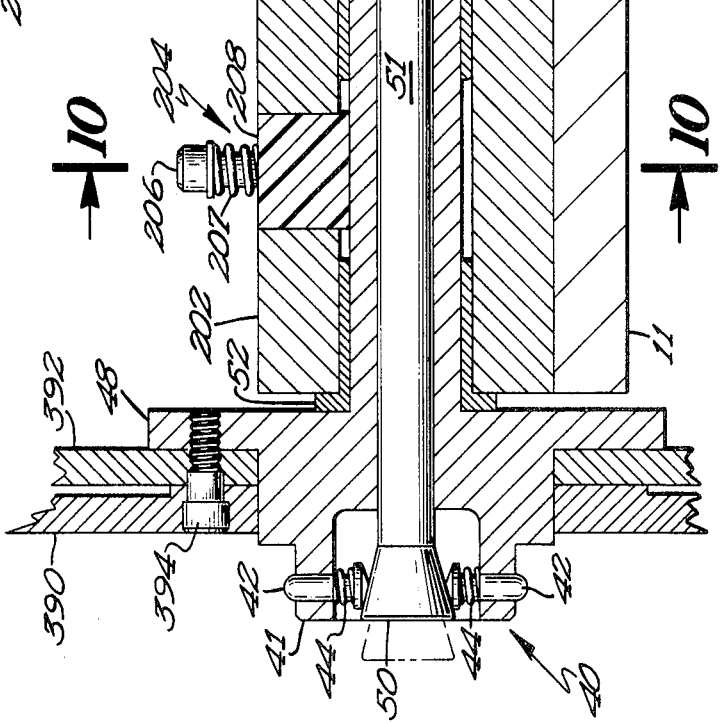

ADJUSTABLE AUTOMATIC TRAY LOADING AND INDEXING MECHANISM

BACKGROUND OF THE INVENTION

1. Field of the Invention

This invention relates generally to article handling apparatus, and more specifically to an automatic tray loading and indexing mechanism. The invention has particular application to loading of small, relatively thin articles, such as slide transparencies, into circular trays for holding transparencies.

2. Description of the Prior Art

In recent years, use of slide transparencies as a means of presenting information has increased. At the same time, circular slide trays which hold 80 or 140 slides and projectors which use such trays have come into widespread use. Many slide programs are developed with these facilities in mind, using one or more slide trays filled with prearranged programs of slides.

Hand insertion of slides into one or a small number of slide trays is a tedious, time consuming task. In addition, as the task becomes more repetitive, human error becomes more likely. While hand insertion is still the most available method for small jobs, some slide programs, as, for example, in a company-wide information program for a large company, may be reproduced and distributed in dozens or hundreds of copies. When each program involves hundreds of slides, hand insertion becomes prohibitively expensive in terms of labor; the possibilities of error are also multiplied. An article loading mechanism becomes the only efficient solution.

Article loading mechanisms of various kinds are known in the art. Some have an elevator mechanism for engaging an article and moving it into or out of a compartment or receptacle. These generally have a separate mechanism for indexing the receptacle into which articles are placed and a separate mechanism for loading or unloading the receptacle. Also known is a device for successively loading one or more articles into compartments of a tray having a plurality of adjacent compartments by means of a single member which performs the dual function of loading and indexing, e.g., U.S. Pat. No. 3,727,371. Indexing mechanisms specifically adapted for a slide tray are also known, e.g., U.S. Pat. No. 3,236,113. Although these various mechanisms are known, at present there is no known mechanism which can load small, relatively thin articles, such as slide transparencies, into circular slide trays swiftly and automatically.

SUMMARY OF THE INVENTION

The present invention involves a loading and indexing mechanism for successively loading articles into the compartments of a circular tray having a plurality of uniformly spaced adjacent compartments. In accordance with the present invention, a loading and unloading mechanism has an article insertion station where the article to be inserted is placed before insertion. The mechanism further includes rotatable mounting means for holding the circular tray for rotational movement, whereby during the rotational movement consecutive adjacent compartments move into registration with the insertion station. Detent means is used to stop and to hold the rotatable mounting means at consecutive angular positions corresponding to adjacent compartments being in registration with the insertion station. Insertion means which cooperates with and is synchronized with the rotatable mounting means and with the detent means inserts the article present at the insertion station into the compartment which is in registration with the insertion station. A feed means delivers consecutive articles to the insertion station as articles are inserted into the compartments by the insertion means. Rotating means connected to the rotatable mounting means cooperates with and is synchronized with the insertion means and the detent means for rotating the rotatable mounting means in small increments between consecutive angular positions so that consecutive articles may be inserted.

The principal objectives of the invention are (a) to provide a loading and indexing mechanism for loading the compartments of a circular tray having uniformly spaced adjacent compartments; (b) to provide a device for loading slide transparencies into a circular slide tray having either 80 or 140 uniformly spaced, adjacent compartments; (c) to provide a slide tray loading device which can load slides at varying speeds and significantly more quickly than they could be loaded by hand; and (d) to provide a slide loading mechanism which will load slides automatically until it has loaded a predetermined number of slides.

BRIEF DESCRIPTION OF THE DRAWINGS

FIG. 4 is a cross-sectional view of the rotatable tray mounting means and the tray rotating means of the present invention taken along line 4—4 of FIG. 2.

FIG. 6 is an end view of the pawl actuator mechanism of the detent means of the present invention as viewed from lines 6—6 of FIG. 2.

FIG. 7 is an end view of a portion of the tray rotating means of the present invention as viewed from line 7—7 of FIG. 2.

FIG. 8 is a side view of a portion of the actuator mechanism for the tray rotating means of the present invention as viewed from line 8—8 of FIG. 2.

FIG. 9 is a cross-sectional view of the insertion means of the present invention as viewed along line 9—9 of FIG. 2.

FIG. 10 is a cross-sectional view of a portion of the tray rotating means of the present invention as seen along line 10—10 of FIG. 4.

DESCRIPTION OF THE PREFERRED EMBODIMENT

Figure 1:
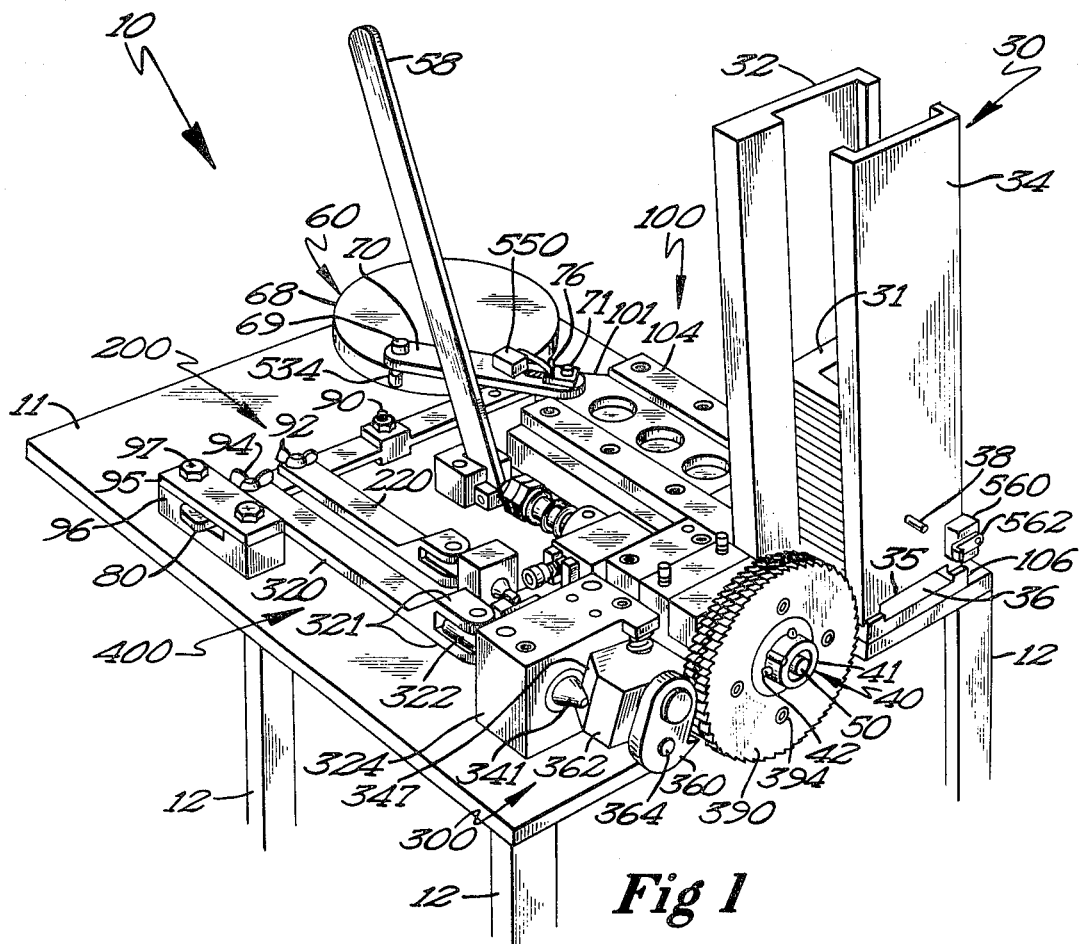
FIG. 1 is a pictorial view of the loading and indexing mechanism of the present invention.

In the following, the invention will be described in terms of an embodiment adapted to handle slide transparencies and circular slide trays, although it will be clear that the invention can be adapted for other articles and trays to hold them. As best seen in FIG. 1, the loading and indexing mechanism 10 of the present invention consists of a group of interrelated and coordinated assemblies. These include the following: (1) a slide feed magazine 30, which holds a stack of slides 31 to be inserted and has an insertion station 36 at its lower end; (2) a rotatable mounting means 40 on which is mounted the circular slide tray 20 (see FIG. 2) into which the slides 31 are to be inserted; (3) drive means 60, including a motor 61 (see FIG. 3) driving a cam and crank plate 68 to which various rods are linked to drive the various portions of the mechanism 10; (4) insertion means 100 powered by the drive means 60 to push a slide 31 positioned at the insertion station 36 into a compartment 22 (see FIG. 3) of the circular slide tray 20; (5) indexing means 400, consisting of tray rotating means 200, which moves the rotatable mounting means 40 and the attached tray 20 in small angular increments as controlled by the detent means 300, so as to place consecutive slides 31 in consecutive compartments 22 of the slide tray 20; and (6) a control system 500 (see FIGS. 3 and 13) for regulating the speed of the motor 61 and turning the motor 61 on or off in response to certain signals. The various elements forming items (1)–(5) previously listed are mounted on a flat base plate 11, to which legs 12 are attached. The location of item (6) is not explicitly shown but would be below or beside the base 11 within easy reach for the required electrical connections.

Figure 2:
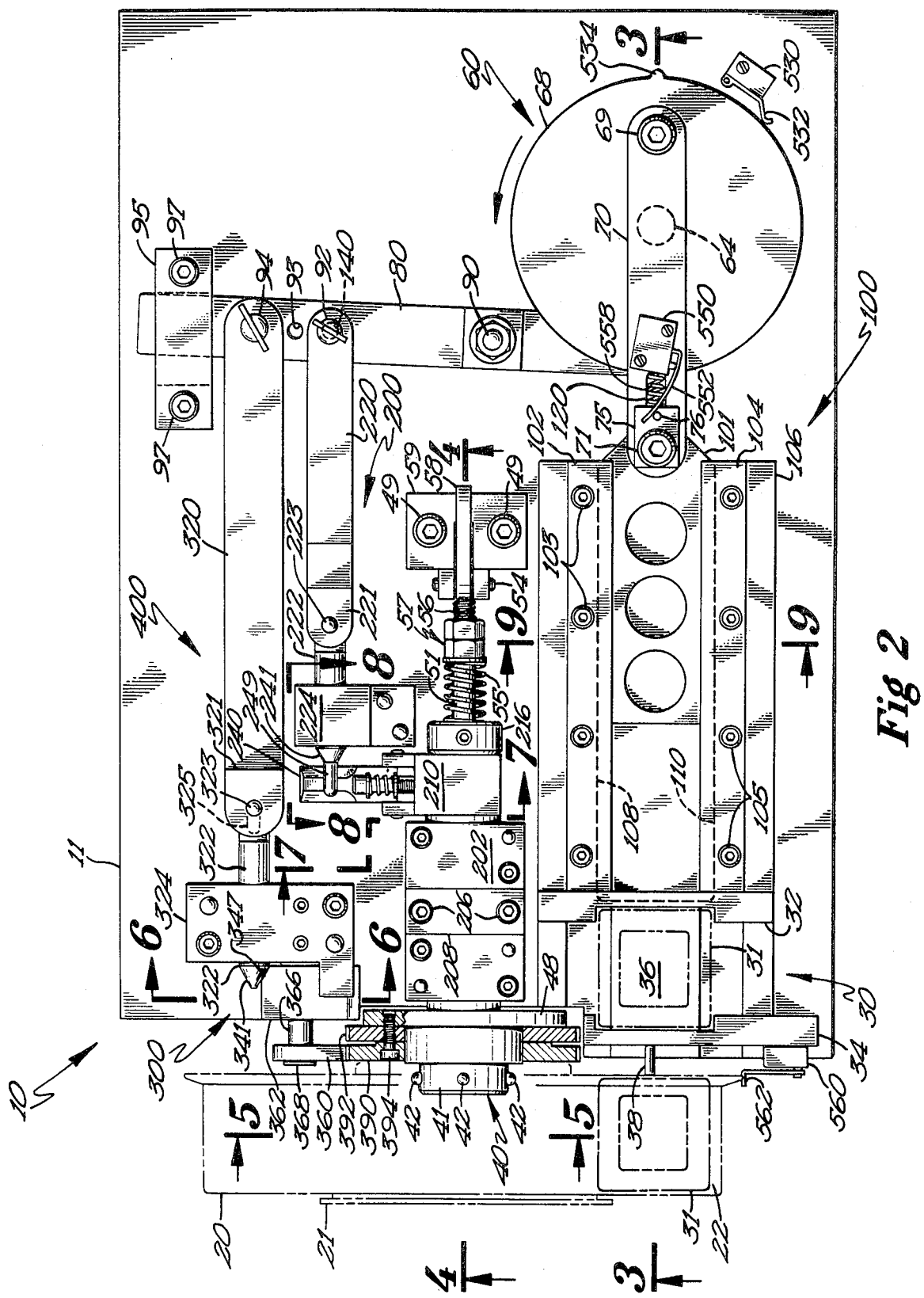
FIG. 2 is a plan view of the present invention showing in phantom lines the manner in which slides and a circular slide tray are used in connection with the invention.

As best seen in FIGS. 1 and 2, the slide feed magazine 30 consists of a pair of upright channel members 32, 34 having their legs turned towards each other and forming between them a rectangular, columnar space in which a stack of slides 31 can be inserted. The insertion station 36 is defined by the inserter base plate 106 in combination with the lower ends of channels 32 and 34. A portion of the lower end of the web of channel 34 has been removed to form the upper half of an insertion slot 35 through which a slide 31 travels and by which a slide 31 is guided into the compartment 22 of the slide tray 20 which is in registration with the insertion station 36. A portion of the lower end of the web of the channel 32 has similarly been removed to permit the insertion means 100 to act on the slide located at the insertion station 36. A tray bottom alignment pin 38 is located on the outside of channel 34 for insertion in a corresponding opening in a slide tray bottom. The alignment pin 38 holds the bottom of a tray 20 stationary with the slide exit slot (not shown) in registration with the insertion station 36.

Figure 3:
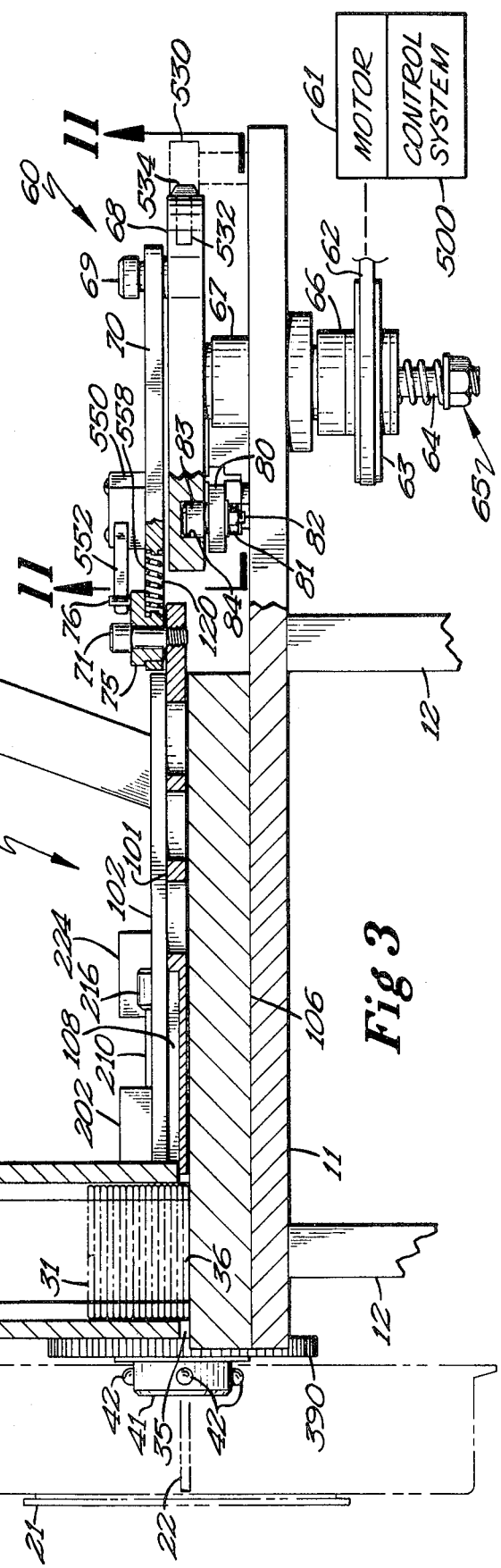
FIG. 3 is a cross-sectional view of the insertion means of the present invention taken along the line 3—3 of FIG. 2.

The insertion means 100 is best seen in FIGS. 2, 3 and 9. As seen there, the inserter bar 101 is a flat bar of rectangular cross-section, with three circular openings in it from which material has been removed for balance and lightness. The thickness of the inserter bar 101 is reduced at its working end such that it corresponds approximately to the cross-section of a slide and so that it can travel all the way through the insertion station 36 to push a slide 31 completely into the compartment 22 which is in registration with the insertion station 36. The inserter bar 101 is slidingly supported in opposing grooves 108, 110 in a pair of oilite slide bearings 102, 104. The bearing 102, 104 are fastened to a slide base 106 by indented set screws 103, 105. The end of the inserter bar 101 is connected to a crank bar 70, which receives its driving force from the cam and crank plate 68. The connection between inserter bar 101 and crank bar 70 includes a cap screw 71 and a jam detection slide block 75, described in greater detail below.

Figure 5:
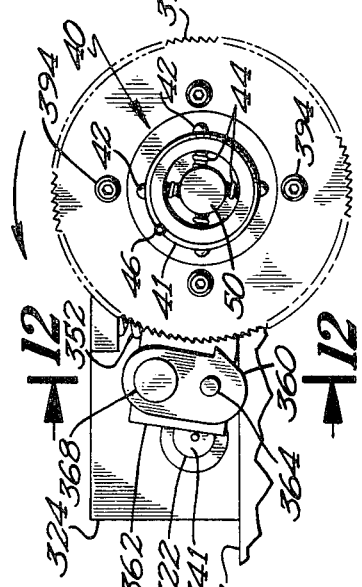
FIG. 5 is an end view of the rotatable tray mounting means and the pawl and ratchet mechanism which form a part of the detent means of the present invention as viewed from line 5—5 of FIG. 2.

Turning now also to FIG. 4, the rotatable mounting means 40 for a slide tray 20 having a locking ring 21 for securing inserted slides can be seen. As best seen in FIG. 4, the rotatable mounting means 40 includes a stepped hub 41 from which a tubular axle 45 extends. The outermost portion of the hub 41 is sized to fit the central opening of the slide tray 20. Spring mounted lugs 42 engage the interior of the slide tray 20 when they are driven outwardly from the center of the hub 41 against the force of springs 44 by the conical end 50 of a release rod 51 which extends through the tubular axle 45. As best seen in FIG. 5, the hub 41 also includes an alignment key 46, which engages a corresponding key notch (not shown) in the slide tray 20. It should be noted that when most models of conventional circular slide trays are placed on hub 41, this serves to trip the tray's circular latch which surrounds the hub 41 to release the slide tray bottom for rotation. In the Model 140 slide tray made by Kodak, a different tray bottom release mechanism is present. To trip this mechanism a small trip lever (not shown) can be mounted on channel 34 above the insertion station 36.

Turning to FIG. 4, the release rod 51 is seen to extend from its conical end 50 within the hub 41 to a threaded end 56 terminated by a nut and washer grouping 57. Encircling the release rod 51 adjacent to the nut and washer grouping 57 is a spring 55 which extends toward a collar 216 secured by set screw 218 to the exterior of the tubular axle 45. This spring 55 biases the release rod 51 into a retracted position with the conical end 50 withdrawn into the hub 41. Also encircling the cylindrical axle 45 is a pair of sleeve bearings 52, 53. Between the right-hand sleeve bearing 53 (as seen in FIG. 4) and the collar 216 is a one-way bearing or slip-clutch 210 assembly, the function of which will be discussed in greater detail below.

Referring still to FIG. 4, a tray release handle 58 pivotally mounted on a pin 54 passing through a pair of ears on one side of the release handle pivot block 59 may be seen. When the upper end of the release handle 58 is moved from a position tilted away from the hub 41 to a position tilted toward the hub 41, it will be seen that the release rod 51 and its cone shaped end 50 are driven leftward (as seen in FIG. 4). This movement permits the spring mounted lugs 42 to retract into the hub 41.

Referring now to FIGS. 1, 2 and 3, the drive means 60 of the present invention may be described. As indicated schematically in FIG. 3, the motor 61 serves as the prime mover for the mechanism 10 and is controlled by a control system 500. In the preferred embodiment, the motor is a permanent magnet DC motor, which responds to variable voltages to run at various speeds, delivering ⅛ h.p. with a speed range of 0 to 160 r.p.m., such as the Model 4Z128 motor made by Dayton Electric Manufacturing Co. of Chicago. The motor 61 is linked by any suitable means, such as the belt 62, to a pulley or drive sprocket 63 attached to a drive shaft 64. The lower end of the drive shaft 64 includes a spring, nut and washer grouping 65. Above the drive pulley 63 are sleeve bearings 66 and a drive bearing 67 enclosed in a housing. Connected to the top of the drive shaft 64 is the cam and crank plate 68.

Figure 11:
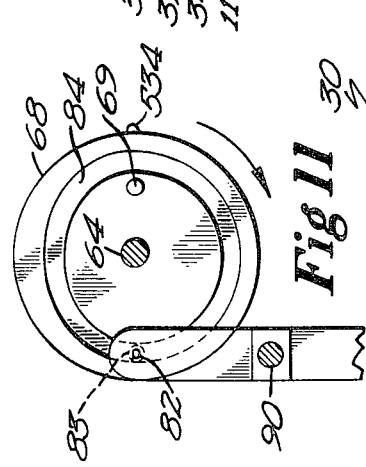
FIG. 11 is a partial cross-sectional and lower plan view of a portion of the drive means of the present invention as seen along line 11—11 of FIG. 3.

The circular motion of the cam and crank plate 68 as driven by the motor 61 is transmitted to two rods. The first of these rods is crank rod 70, one end of which is rotatably attached to the cam and crank plate 68 by a cap screw 69. The other end of the crank rod 70 is rotatably attached to the inserter bar 101 by a similar cap screw 71 in jam detection slide block 75. The second rod actuated by the cam and crank plate 68 is the pivot rod 80 which pivots around pivot pin 90 fastened to the base plate 11. As best seen in FIGS. 3 and 11, the circular motion of the cam and crank plate 68 is transmitted to the pivot arm 80 by means of a track groove 84, having the shape of a circle with one side squashed towards the center, in which a cylindrical cam 83 travels. The cam 83 is rotatably mounted by means of a threaded pin 82 and nut 81 on one end of the pivot rod 80. The opposite end of the pivot rod 80 is supported and restrained in a rectangular slot formed by a U-shaped block 96 on which a flat plate 95 is fastened by means of cap screws 97. As will be described in greater detail below, cam arms 220, 320 for the rotating means 200 and the detent means 300 are rotatably attached to the pivot arm 80 between the pivot pin 90 and the U-shaped block 96 by means of wing tab screw pins 92 and 94, respectively.

Turning now to FIGS. 2, 4, 7, 8 and 10, the rotating means 200 for rotating the hub 41 and the attached slide tray 20 will be described. As best seen in FIG. 2, the cam arm 220 for the rotating means 200 has one end rotatably connected to the pivot arm 80 by means of screw pin 92 in threaded opening 140. The other end is connected to the pusher shaft 222 by means of a pin 223 passing through a pair of ears 221 on the end of the cam arm 220. The pusher shaft 222 slides in a horizontal cylindrical opening through the cam bearing block 224. The end of pusher shaft 222 opposite the end connected to cam arm 220 has a tapered cam surface 241 thereon, which engages the corresponding chamfer 247 on an L-shaped cam follower 240. (The outer end of pusher shaft 222 is a pin or short rod 249.) The L-shaped cam follower 240 is, in turn, attached by means of rocker pin 242 and cap screw pin 224, encircled by a spring 245, to the housing 212 surrounding a one-way bearing or slip clutch 214. As can be seen, the L-shaped cam follower 240 is biased against the cam surface 241 by a spring 227 located in the spring pocket 226 below the cam follower 240. A cap screw 228 extending into the spring pocket 226 can be used to adjust the tension on the spring 227. As also can be seen, driving the cam surface 241 against the chamfer 247 on the end of the L-shaped cam follower 240 causes the one-way bearing 214, the axle 45 and the hub 42 to rotate in a counterclockwise direction (as seen in FIG. 7). If the axle 45 is prevented from rotating as far as the motion of cam surface 241 would drive it, then the L-shaped cam follower 240 rotates slightly around rocker pin 42 as the spring 245 is compressed. When the driving action of cam surface 241 ceases, the spring 245 and cam follower 240 return to their original positions.

Because the invention is designed to accomodate more than one tray size, a degree of flexibility is built into the rotating means 200. In particular, it will be seen that when a tray 20 holding eighty slides is used, a greater angular displacement is required to move between consecutive slide compartments 22 than when a tray 20 holding one-hundred forty slides is used. To move from a tray 20 holding a larger number of slides to a tray 20 holding a smaller number of slides, the cam arm 220 and the pusher shaft 222 are replaced by comparable pieces (not shown) which provide slightly greater camming action and, therefore, slightly greater angular rotation. The only differences are that the end of cam arm 220 having screw pin 92 is moved to a new connection point 93 located at a greater distance from pivot pin 90 to provide a slightly longer cam thrust and that the cam surface 241 is made longer by decreasing the diameter of the pin or short rod 249 at the end of pusher shaft 222. These two changes permit a slightly greater angular rotation of the cam follower 240 and the one-way bearing 214 for each thrust of the cam surface 241 against the chamfer 247.

While the axle 45 is permitted to rotate by virtue of its mounting on sleeve bearings 52, 53, it is not permitted to spin freely and easily. Instead, as best seen in FIGS. 4 and 10, its freedom to spin is limited and controlled by a drag brake comprising a nylon block 208 with an arctuate cut-out sized to fit snugly against the axle 45. A pair of cap screws 206, 206, which pass through a pair of springs 207, 207 and through the nylon block 208 to screw into the bearings pillow block 202 can be used to vary the degree of braking. Because the degree of braking is coordinated with operation of the detent means 300 (described next), in normal use, the braking effect is great enough to prevent any free spinning of the hub 42 and attached slide tray 20, but not so great as to resist the action of the one-way bearing 214 in incrementally turning the axle 45.

Referring now to FIGS. 1, 2, 4, 5 and 6, the detent means 300 can be described. As best seen in FIG. 2, the cam arm 320 for the detent means 300 has one end rotatably connected to the pivot arm 80 by means of screw pin 94. The other end is attached to the pusher shaft 322 by means of pin 323 passing through ears 321 at the end of cam arm 320 and through a slot 325 in pusher shaft 322. Referring now also to FIG. 6, it can be seen that the tapered end of shaft 322 forms a cam surface 341 which bears against a corresponding chamfer 347 on pawl holder block 362. The pusher shaft 322 slides in a horizontal cylindrical opening passing through cam bearing block 324.

Figure 12:
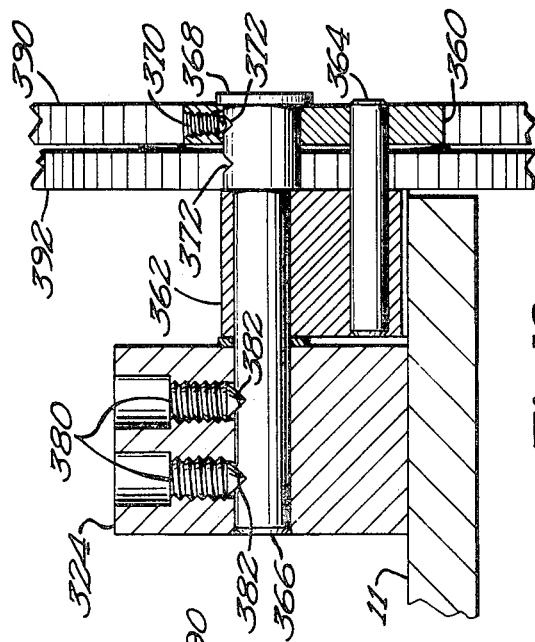
FIG. 12 is a cross-sectional view of a portion of the pawl and pawl actuation mechanism of the detent means of the present invention as seen along line 12—12 of FIG. 5.

As best seen in FIGS. 5 and 12, and in dotted lines in FIG. 6, a pawl 360 is attached to pawl holder block 362 by means of the pawl axle rod 366 and an alignment pin 364. The pawl axle rod 366 has a flanged cap 368 at one end which passes through a hole in the pawl 360. The pawl axle rod 366 passes through pawl holder block 362, which rotates on the pawl axle rod 366, and is inserted into a hole in the cam bearing block 324, where it is fastened by set screws 380 which rest in indentations 382 in the pawl axle rod 366. The alignment pin 364 is press-fitted into a hole in the pawl holder block 362. The chamfer 347 of pawl holder block 362 is biased into engagement with the cam surface 341 by a compressed spring 352 in spring pocket 350. The pawl 360 and the pawl axle rod 366 are located such that the pawl 360 can engage either of the pair of ratchet gears 390, 392 which are mounted by screws 394 or other suitable means against the large flange 48 of the hub 41. As can further be seen, movement of the tapered cam surface 341 against the chamfer 347 of the pawl holder block 362 causes the pawl 360 to move into and out of engagement with the ratchet gears 390, 392.

As best seen in FIG. 1, the two ratchet gears 390, 392 have differing numbers of teeth. The outermost gear 390 has 81 teeth and is used in connection with slide trays having 80 side compartments. The inner gear 392 has 141 teeth and is used with slide trays having 140 slide compartments. Gears with any number of teeth may be chosen to correspond to the compartments in the slide tray 20. Each gear must be aligned in coordination with alignment key 46 and pawl 360 such that optimal registration with the insertion station 36 is achieved. Referring now also to FIG. 12, it can be seen that the pawl 360 can be moved so as to engage one or the other of the ratchet gears 390, 392 by moving the ball detent mechanism 370 into one or the other of the two notches 372 in the flanged cap 368. When this is done, the pawl 360 slides on alignment pin 364 which keeps it aligned.

Figure 13:
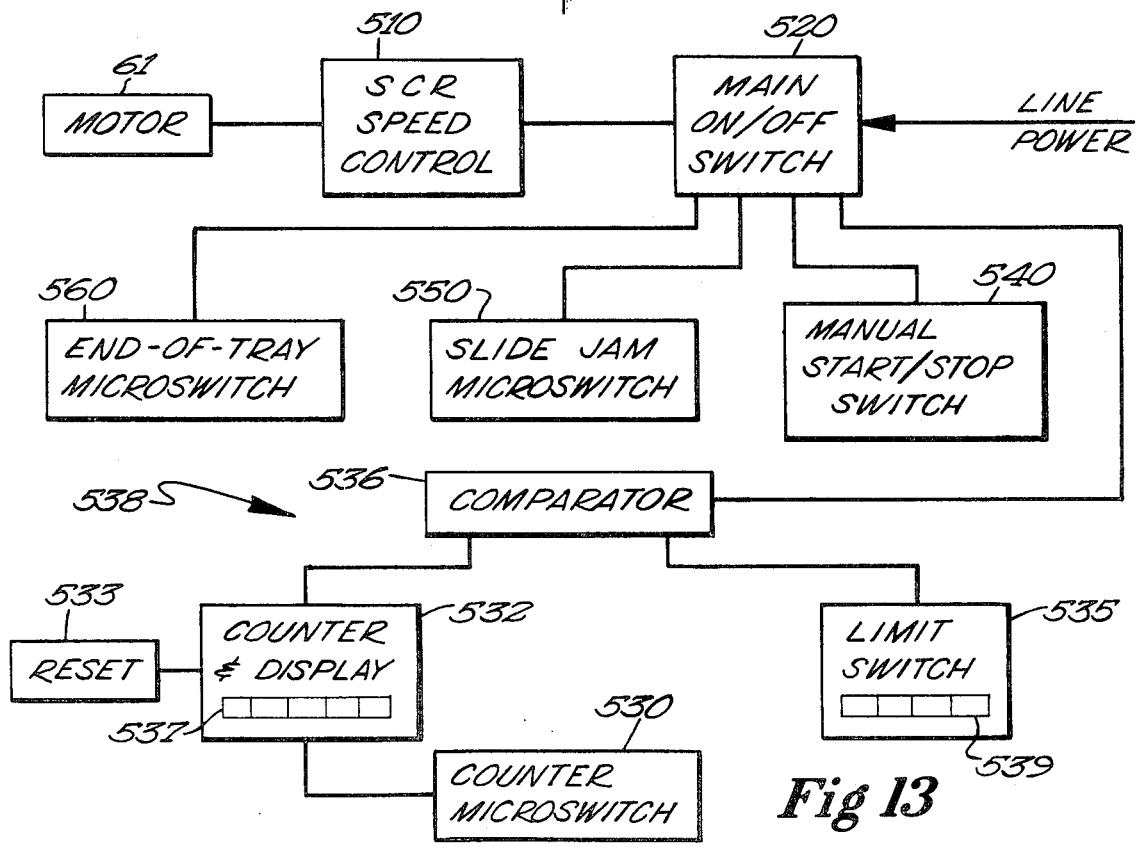
FIG. 13 is a schematic block diagram of the control system of the present invention.

Referring now to FIG. 13, a schematic representation of the control system for the loading and indexing mechanism 10 can be seen. The control system 500 governs both the speed of operation of the mechanism through an SCR speed control 510 and the on/off state of the motor 61 by means of main on/off switch 520. Turning first to the SCR speed control 510, this is a conventional component available from Dayton Electronic Manufacturing Company, which permits regulation of the motor 61 between approximately zero and one-hundred percent of its maximum speed. A calibrated dial permits selection of the desired speed.

On/off control of the motor 61 is effected by means of a main on/off switch 520 which is connected to four signal sources. Three of these signal sources are simple on/off mechanisms: the manual start/stop switch 540, the jam detection microswitch 550 and the end-of-tray microswitch 560. The counter switch mechanism 538 is somewhat more complex, because it involves a pre-set value and comparison of a counter value to the pre-set value in a comparator 536. The comparator 536 delivers an "off" signal to the main on-off switch 520 when the pre-set value contained in the manually-set limit switch 535 is equal to the value in the insertion counter 532, based on a count of insertion operations as signalled by operations of the counter microswitch 530. Also connected to the counter 532 is a reset switch 533 used to return the insertion counter 532 to zero. The insertion counter includes a continuous digital display 537 of the number of insertion operations. The limit switch 534 has several thumbwheels 539 used to select the limit value and to display the limit selected.

As best seen in FIG. 2, the counter microswitch 530 is mounted adjacent the cam and crank plate 68 on the side opposite the inserter bar 101 so that the switch lever 532 is tripped each time the counter cam 534 rotates past the switch lever 532. The counter cam 534, which is a small round protrusion from the side of the cam and crank plate 68, is located adjacent the cap screw 69 so that a count will be registered only after completion of a full insertion and indexing cycle. Suitable electrical wires connect the counter microswitch 530 to the insertion counter 532.

As best seen in FIGS. 1 and 2, the end-of-tray microswitch 560 is mounted near the lower end of the channel 34 and the insertion station 36 such that the switch lever 562 engages the bottom rim of a slide tray 20 which is mounted on the hub 41. The switch lever 562 rides evenly on the bottom rim of the slide tray 20 until the zero slot of tray 20 comes into registration with the insertion station 36. At this point the switch lever 562 is tripped by a notch (not shown) in the tray rim causing an "off" signal to be delivered to the main on/off switch 520 by suitable electrical wires connected thereto.

The jam detection microswitch 550 is mounted near the end of crank rod 70 adjacent cap screw 71 and jam detection slide block 75. Its switch lever 552 extends into a gap between the slide block 75, and the body of microswitch 550. The slide block 75 is slidingly mounted in a slot 120 in inserter bar 101. A partially compressed spring 558 is positioned in the slot 120 to bias the slide block 75 away from microswitch 550. With this arrangement, a slide jam can be detected, because the inserter bar 101 will face resistance as it travels into the insertion station 36. If sufficient resistance is encountered, spring 558 will be compressed, as slide block 75 is driven from the end of slot 120 in which it is normally biased by spring 558. This movement brings slide block 75 closer to microswitch 550, and pin 76 on slide block 75 trips switch lever 552. This causes an "off" signal to be delivered to the main on/off switch 520 by suitable electrical wires connected thereto.

In some circumstances it may be desirable to add an electric brake (not shown) to the control system 500. Such a brake can be located on the lower end of the drive shaft 64 and connected to the main on/off switch 520 to give a more positive stopping action. This can help to prevent an additional insertion operation from occurring due to momentum of the motor 61 or other parts following delivery of a shut-off signal.

OPERATION

Having thus described the detailed structure of the invention, its operation can be explained. In preparation for use of the loading and indexing mechanism 10, a stack of slides 31 is placed in the slide feed magazine 30. Care must be taken to orient the slides in the proper manner so that they will be displayed properly when the tray 20 is used. The reset switch 533 is activated to reset the insertion counter 532 to zero. The limit switch 534 is set for any desired limit less than or equal to the total number of slots contained in the slide tray 20. The ball detent mechanism 370 is used to select either gear 390 or gear 392, depending on the size of the slide tray 20 to be loaded. The desired speed of operation is determined by selecting a speed on the dial on the SCR control 510.

At this point, the orientation of the cam and crank plate 68 should be checked to be sure that the inserter bar 101 is fully retracted. If this is the case then the pawl 360 will be disengaged from the gears 390, 392. Only the nylon block 208 acts to prevent rotation of the tray 20 when it is mounted. Before placing the empty slide tray 20 on the hub 41, the release handle 58 is moved toward the slide feed magazine 30 so as to retract the spring-mounted lugs 42 and permit the tray 20 to be placed over the hub 41. Care should be taken to ensure that the notch in the center hole of the tray 20 is aligned with the alignment key 46 and that the first (or other desired) slide compartment is in registration with the slide insertion station 36. In addition, the tray bottom alignment pin 38 on the side of the slide feed magazine 30 is inserted into the alignment hole (not shown) at the bottom of the slide tray 20. This holds the tray bottom in registration with the insertion station 36 as the tray 20 rotates. A locking ring 21 should also be placed on the tray 20. As noted previously, placing a tray 20 on the hub 41 releases the tray bottom so that the portion of the tray 20 containing the compartments 22 may move independently, except for the Model 140 tray, which requires that a spring release near the outer edge of the tray bottom be tripped.

When the start/stop switch 540 is activated, the cam and crank plate 68 begins to rotate counterclockwise, as seen from the above. This drives the inserter bar 101 between the guide rails 102, 104 towards and through the slide insertion station 36, thus pushing the slide 31 present at the insertion station 36 into the first compartment of the tray 20. This will have occured when the cam and crank plate 68 has rotated approximately 180 degrees and the inserter bar 101 is extended to its farthest point in the direction of the slide tray 20. As the cam and crank plate 68 continues to rotate, the inserter bar 101 begins to retract. At this point, the irregular shape of the track groove 84 in the bottom of the cam and crank plate 68 begins to cause the pivot bar 80 to pivot so as to drive the pusher shafts 222 and 322 outward in the direction of the tray 20. Outward movement of the pusher shaft 322 occurs slightly after outward movement of pusher shaft 222, due to the slot 325 in the end of shaft 322 through which the pin 324 passes.

Outward movement of pusher shaft 222 causes the cam surface 241 to move the L-shaped cam follower 240 and to make an incremental rotation of the axle 45 through the one-way bearing 214. Rotation occurs in the counterclockwise sense as seen in FIG. 5. By the time this incremental rotation has started, the "slack" afforded by the slot 325 in the end of pusher shaft 322 has been used up. Now pusher shaft 322 moves outward, causing the cam surface 341 to engage the chamfer 347 of the pawl holder block 362. This causes the pawl 360 to engage the ratchet gear 390 (or 392, as the case may be) at a point between two teeth. Because both of the pusher shafts 222, 322 continue to move outward during the time when the cam and crank plate 68 moves the first ninety degrees of rotation in a direction to retract the inserter bar 101, the axle 45 will continue to rotate until the pawl 360 contacts and locks against the next tooth on ratchet gear 390 (or 392, as the case may be). Action of the pawl 360 against the gear tooth will stop rotation of the axle 45 and rotatable mounting means 40 so that the next successive compartment 22 of the tray 20 is in registration with the insertion station 36.

During the next ninety degrees of rotation (i.e., the last one-quarter turn as the inserter bar 101 returns to its fully retracted position), the track groove 84 causes both of the pusher shafts 222, 322 to retract. Retraction of the pusher shaft 222 has no effect on the rotation of axle 45 due to one-way bearing 214, although the cam follower 240 rotates back to its spring-biased position. Retraction of the pusher shaft 322 occurs slightly after retraction of pusher shaft 222 due to the slot 325 in the end of shaft 322. When the pusher shaft 322 retracts, the spring 352 drives the pawl 360 out of engagement with the ratchet gear 390 (or 392, if this gear has been selected). The tray 120 has now been indexed to the next successive compartment, which will be held in registration with the insertion station 36 by means of the nylon brake 308, although the pawl 360 which stopped rotation of the axle 45 at the exact point of registration is now disengaged.

At this point, one rotation cycle of the cam and crank plate 68 has been completed and counted by microswitch 530. The inserter bar 101 has been fully retracted, permitting the next consecutive slide to enter the insertion station 36. Similar insertion cycles continue until the mechanism is manually stopped by means of start/stop switch 540 or until one of the other automatic switches 538, 550 or 560 causes the main on/off switch 520 to turn off.

From the above description of the preferred embodiment, it will be seen that the invention will permit rapid loading of circular slide trays. In fact, with a prototype slide loading at a rate of approximately 100 slides per minute has been achieved. It will also be seen that the invention permits slide trays of various sizes to be used by the simple expedient of substituting gears having the appropriate number of teeth.

It will be clear to one skilled in the art that a number of modifications can be made to the above-described preferred embodiment without essentially changing the invention. Accordingly, while the preferred embodiment of the invention has been described and illustrated, it is to be understood that the invention is not limited to the precise construction herein disclosed and the right is reserved to all changes and modifications coming within the scope of the invention as defined in the appended claims.

I claim:

1. In a loading and indexing mechanism for successively loading articles into the compartments of a circular tray having a center axis and a plurality of vacant uniformly spaced adjacent compartments about said axis, each compartment having an axially oriented opening the combination comprising:
    an article insertion station;
    rotatable mounting means for selectively engaging said tray along said center axis for imparting rotational movement to said tray at said axis whereby during said rotational movement consecutive adjacent compartments move into registration with said insertion station;
    detent means for stopping rotation of and holding said rotatable mounting means at consecutive angular positions corresponding to adjacent compartments being in registration with said article insertion station;
    insertion means operably coupled with and synchronized with said rotatable mounting means and said detent means for axially inserting an article present at the insertion station into the axially oriented opening of a compartment in registration with said insertion station;
    feed means for delivering consecutive articles to said insertion station as articles are inserted in said compartments by the insertion means;
    rotating means operably coupled to the rotatable mounting means and cooperating with and synchronized with said insertion means and detent means for rotating said rotatable mounting means in small angular increments between consecutive angular positions so that consecutive articles may be inserted; and
    braking means operably coupled to said rotating means for preventing free spinning of said rotating means when said detent means are disengaged from said rotatable mounting means.

2. The mechanism as set forth in claim 1, said brake means comprising a drag brake for exerting a constant force on said rotating means, and adjustment means operably coupled to said drag brake for selectively varying the amount of said force.

3. The mechanism as recited in claim 1, further comprising control means operably coupled with said detent means, insertion means and rotating means for adjusting the speed of the mechanism for faster or slower insertion of articles.

4. The mechanism as recited in claim 1, further comprising counter means for counting the number of articles inserted and for maintaining the count as a stored value.

5. The mechanism as recited in claim 4, further comprising:
   means for selecting a limit value as a limit on the number of articles to be inserted;
   means for comparing the selected limit value with the count value stored in said counter means and for producing a shutoff signal when the two values are equal; and
   means responsive to the shutoff signal for turning the mechanism off.

6. The mechanism as recited in claim 5, further comprising means for detecting a zero slot in the tray and for turning the mechanism off in response to detection of the zero slot.

7. The mechanism as recited in claim 1, wherein the feed means is a stack holder which delivers articles to the insertion station by gravity.

8. The mechanism as recited in claim 1, further comprising means for detecting when a jam occurs at the insertion station and for turning the mechanism off when such a jam is detected.

9. The mechanism as set forth in claim 1, said tray including an annular inner sidewall defining a central opening about said center axis, said mounting means including means for engaging said tray inner sidewall for imparting said rotational movement to said tray.

10. The mechanism as set forth in claim 9, said tray engaging means including a rotatable hub for receiving said tray central opening, and a plurality of retractable lugs operably coupled to said hub and selectively engageable with said tray inner sidewall for selectively coupling said tray to said hub for rotation therewith.

11. The mechanism as set forth in claim 1, said detent means including a pair of ratchet toothed gears having differing numbers of gear teeth, said gears being aligned along a gear axis, and said detent means further including a pawl operably coupled to said rotating means and shiftable along a pawl axis generally parallel to said gear axis, whereby said pawl is selectively engageable with a selected one of said gears for indexing the rotational movement of said rotating means in larger or smaller angular displacements depending on which one of said gears is selected.

12. The mechanism as set forth in claim 11, said means for rotating said mounting means including a rotatable elongated drive shaft operably coupled to said mounting means, said gears being fixedly coupled to said shaft for rotation therewith.

13. In a loading and indexing mechanism for successively loading articles into the compartments of a circular tray having a plurality of uniformly spaced adjacent compartments, the combination comprising:
   an article insertion station;
   rotatable mounting means for holding said tray during rotational movement, whereby during said rotational movement consecutive adjacent compartments move into registration with said insertion station;
   adjustable detent means for stopping rotation of and holding said rotatable mounting means at consecutive angular positions corresponding to adjacent compartments being in registration with said article insertion station;
   insertion means operably coupled with and synchronized with said rotatable mounting means and said detent means for inserting an article present at the insertion station into a compartment in registration with said insertion station;
   feed means for delivering consecutive articles to said insertion station as articles are inserted in said compartments by the insertion means; and
   rotating means connected to the rotatable mounting means and cooperating with and synchronized with said insertion means and detent means for rotating said rotatable mounting means in small increments between consecutive angular positions so that consecutive articles may be inserted,
   said detent meanings comprising—
      a pawl;
      at least two gears aligned along a gear axis and operably coupled to said mounting means, each gear having a different number of teeth corresponding to compartments in which articles are inserted; and
      means for selectively shifting said pawl along a pawl axis generally parallel to said gear axis for alignment of said pawl with one of said gears for engagement of said one gear, whereby said rotatable mounting means are indexed in larger or smaller angular displacements depending on which of said gears is selected.

* * * * *